United States Patent
Puckett

(10) Patent No.: US 8,493,625 B2
(45) Date of Patent: Jul. 23, 2013

(54) DETERMINING COMPOSITE COLOR FOR DITHERED OBJECT AND CONTONE OBJECT

(75) Inventor: Giles Anderson Puckett, Samford (AU)

(73) Assignee: Canon Kabushiki Kaisha, Tokyo (JP)

( * ) Notice: Subject to any disclaimer, the term of this patent is extended or adjusted under 35 U.S.C. 154(b) by 381 days.

(21) Appl. No.: 12/946,188

(22) Filed: Nov. 15, 2010

(65) Prior Publication Data

US 2011/0122450 A1    May 26, 2011

(30) Foreign Application Priority Data

Nov. 26, 2009  (AU) .................................. 2009240860

(51) Int. Cl.
*G06K 15/00* (2006.01)
*H04N 1/405* (2006.01)

(52) U.S. Cl.
USPC ........................................ 358/3.06; 358/3.13

(58) Field of Classification Search
USPC ................. 358/3.06, 3.13, 1.9, 3.14, 3.16
See application file for complete search history.

(56) References Cited

U.S. PATENT DOCUMENTS

| 5,854,882 | A | 12/1998 | Wang |
| 6,313,847 | B1 | 11/2001 | Carlsen |
| 7,231,096 | B2 * | 6/2007 | Broddin et al. ............... 382/254 |
| 7,286,142 | B2 | 10/2007 | Smith et al. |
| 7,304,648 | B2 | 12/2007 | Beaumont et al. |
| 7,477,265 | B2 | 1/2009 | Smith et al. |
| 7,567,363 | B2 | 7/2009 | Silverbrook et al. |
| 2009/0180685 | A1 * | 7/2009 | Fowler .......................... 382/167 |

OTHER PUBLICATIONS

Notice of Acceptance dated Dec. 13, 2011 from IP Australia in counterpart JP 2009-240860.

* cited by examiner

*Primary Examiner* — Douglas Tran
(74) *Attorney, Agent, or Firm* — Fitzpatrick, Cella, Harper & Scinto

(57) ABSTRACT

Methods (200), apparatuses, and computer readable storage mediums for determining a composite color for a region of overlap between a dithered object and a contone object (210) are disclosed. A reconstructed contone object is determined from the dithered object (202). Errors are corrected for (205) in the reconstructed contone color of the dithered object. The corrected contone object and the contone object are composited (206) to determine the composite color for the region of overlap.

20 Claims, 7 Drawing Sheets

DETERMINING COMPOSITE COLOR FOR DITHERED OBJECT AND CONTONE OBJECT

REFERENCE TO RELATED PATENT APPLICATION

This application claims the benefit under 35 U.S.C. §119 of the earlier filing date of Australian Patent Application No. 2009240860, filed Nov. 26, 2009, which is hereby incorporated by reference in its entirety as if fully set forth herein.

TECHNICAL FIELD

The present invention relates to computer graphics, and in particular, to a method of rendering graphical objects using the minimum available computer memory.

BACKGROUND

Computer software systems such as word processors, page composition programs and the like are generally configured to render, into device pixels, collections of graphical objects such as bitmap images, photographic images, text, and filled shapes. Rendering systems commonly use a pixel-sequential method of generating pixel output, which involves determining the color of graphical objects between their edges and compositing the colors of the contributing objects for the run of pixels between their edges. In addition, a frame store may be used to hold the entire page or parts thereof, either in the normal course of rendering or as an error-recovery mechanism to be invoked when the pixel-sequential renderer exhausts some resource such as system memory. Some systems do not use pixel-sequential rendering at all and simply use the frame store for all objects, while others are pure pixel-sequential renderers that do not use a frame store at all.

As graphical objects are received the graphical objects are painted onto the page. This may involve simply overwriting memory ("painter's algorithm") or else involve compositing operations such as transparency, blending and other techniques well known in the art. In these latter cases, the results depend on the current object and also on the destination (background) pixel data. These may be the results of previous rendering steps that have to be fetched from a framestore. Color accuracy is desirably maintained by storing this intermediate data at a sufficiently high bit depth, even if the final output is dithered (halftoned) or otherwise reduced in bit depth to drive a print engine. However, modern printers have high pixel resolutions (e.g. 1200 dpi), which makes the memory usage of a full-page frame store prohibitive (an A4 page at 1200 dpi may require hundreds of megabytes of storage).

SUMMARY

In accordance with an aspect of the invention, there is provided a computer-implemented method of determining a composite color for a region of overlap between a dithered object and a contone object. A reconstructed contone object is determined from the dithered object. Errors are corrected for in the reconstructed contone color of the dithered object. The corrected contone object and the contone object are composited to determine the composite color for the region of overlap.

The step of determining the reconstructed contone object may comprise applying a filtering operation to a pixel of a different contone object that is the basis of the reconstructed contone object. The filtering operation may take into account a value of the pixel and immediate neighbours of the pixel.

The filtering operation may comprise a convolution with a Gaussian kernel, an inverse distance weighted kernel, or a uniform averaging kernel. The kernel size may be smaller than the size of a dither matrix used to provide the dithered object.

The filtering operation may be centrally weighted on the pixel of the different contone object and takes into account pixels in the immediate neighbourhood of the pixel of the different contone object.

The error correcting step may correct the reconstructed contone color of the dithered object for nonlinearity introduced by the filtering operation.

The step of determining the reconstructed contone object may comprise dithering a different contone object that is the basis of the reconstructed contone object.

The method may further comprise the step of converting a result of the compositing step to a dithered data.

The method may further comprise storing the dithered data in a framestore.

The compositing step may comprise a transparency blending operation, where the reconstructed contone object and the contone object each comprise an alpha channel.

In accordance with a further aspect of the invention, there is provided an apparatus for determining a composite color for a region of overlap between a dithered object and a contone object. The apparatus comprises: a memory for storing data and a computer program; and a processor unit coupled to the memory for executing a computer program, the memory and the processor configured to determine the composite color. The computer program comprises: a computer program code module for determining a reconstructed contone object from the dithered object; a computer program code module for correcting for errors in the reconstructed contone color of the dithered object; and a computer program code module for compositing the corrected contone object and the contone object to determine the composite color for the region of overlap.

The computer program code module for determining the reconstructed contone object may apply a filtering operation to a pixel of a different contone object that is the basis of the reconstructed contone object, the filtering operation taking into account a value of the pixel and a plurality of immediate neighbours of the pixel.

The filtering operation may comprise a convolution with a Gaussian kernel, an inverse distance weighted kernel, or a uniform averaging kernel.

The filtering operation may be centrally weighted on the pixel of the different contone object and takes into account pixels in the immediate neighbourhood of the pixel of the different contone object.

The computer program code module for compositing may apply a transparency blending operation, where the reconstructed contone object and the contone object each comprise an alpha channel.

In accordance with yet another aspect of the invention, there is provided a computer readable storage medium having recorded therein a computer program for determining a composite color for a region of overlap between a dithered object and a contone object for execution by a processing unit. The computer program comprises: a computer program code module for determining a reconstructed contone object from the dithered object; a computer program code module for correcting for errors in the reconstructed contone color of the dithered object; and a computer program code module for compositing the corrected contone object and the contone object to determine the composite color for the region of overlap.

The computer program code module for determining the reconstructed contone object may apply a filtering operation to a pixel of a different contone object that is the basis of the reconstructed contone object, the filtering operation taking into account a value of the pixel and a plurality of immediate neighbours of the pixel.

The filtering operation may comprise a convolution with a Gaussian kernel, an inverse distance weighted kernel, or a uniform averaging kernel.

The filtering operation may be centrally weighted on the pixel of the different contone object and takes into account pixels in the immediate neighbourhood of the pixel of the different contone object.

The computer program code module for compositing may apply a transparency blending operation, where the reconstructed contone object and the contone object each comprise an alpha channel.

In accordance with a further aspect of the invention, there is provided a computer-implemented method of rendering a region of overlap between a first object having halftoned pixel data and a second object having contone pixel data using a marking engine. The method comprises the steps of: dehalftoning the first object to determining a contone color in the region of overlap using the halftoned pixel data and a dehalftoning process, the dehalftoning process based on a characteristic of the marking engine; correcting for error in the determined contone color of the region of overlap based on the characteristic of the marking engine; compositing the contone color of the region of overlap with the contone pixel data of the second object to produce a result color; and halftoning the result color using a halftoning process based on the characteristic of the marking engine.

BRIEF DESCRIPTION OF THE DRAWINGS

Embodiments of the invention are described hereinafter with reference to the drawings, in which.

DETAILED DESCRIPTION

Figure 1A:
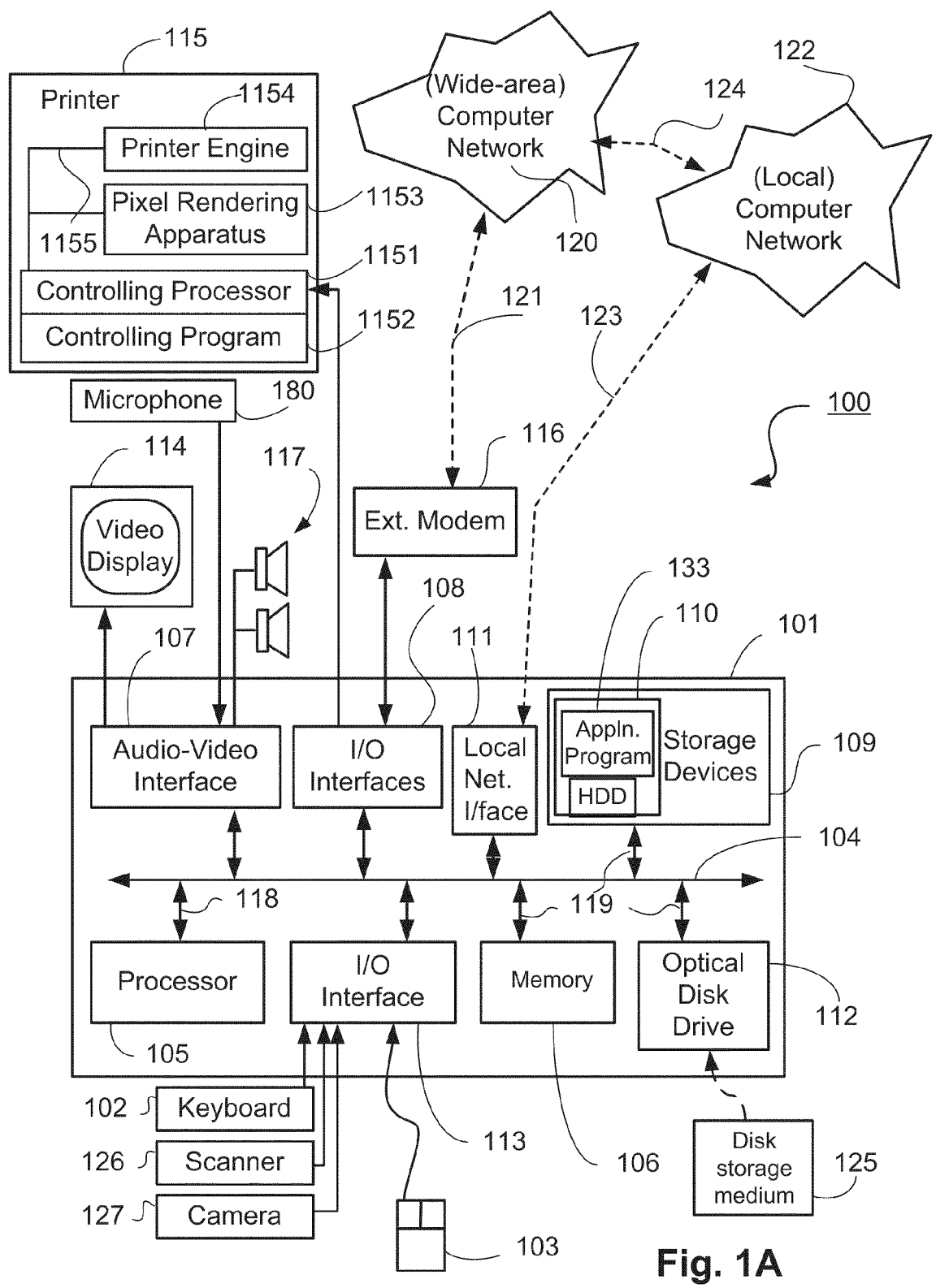
FIGS. 1A and 1B collectively form a schematic block diagram of a general-purpose computing system, with which embodiments of the invention may be implemented.

Methods, apparatuses, and computer readable storage mediums for determining a composite color for a region of overlap between a dithered object and a contone object are disclosed. In the following description, numerous specific details, including particular cell sizes, color spaces, dither matrices, and the like are set forth. However, from this disclosure, it will be apparent to those skilled in the art that modifications and/or substitutions may be made without departing from the scope and spirit of the invention. In other circumstances, specific details may be omitted so as not to obscure the invention.

Where reference is made in any one or more of the accompanying drawings to steps and/or features, which have the same reference numerals, those steps and/or features have for the purposes of this description the same function(s) or operation(s), unless the contrary intention appears.

[Overview]

The embodiments of the invention seek to provide a frame store that is an image of the final engine output at reduced bit depth, thereby saving memory. However, the ability to use this data for compositing is also preserved in the event that this is required. The embodiments of the invention apply to systems that use a framestore at least some of the time. The embodiments of the invention are not specific to pixel-sequential rendering systems, although these systems derive a significant benefit from the embodiments of the invention, since a frame store is typically the largest single consumer of memory.

In one embodiment of this invention, a pixel-sequential renderer is invoked to render a span of pixels from a foreground graphical object that is composited with background dithered or halftoned engine data in memory. Since the original destination color has been lost, the embodiments of the invention seek to reconstruct the original destination color from the dithered background. Using a filtering or averaging process to reverse the dithering process on the background is expensive, because many surrounding pixels must be read and processed. In addition, this step introduces blurring of the background that may be much more noticeable than the pattern cells.

The background color can be approximated by a filtering process using the immediate neighbourhood pixels. Typically, the pixel and its eight neighbours are taken into account. This results in background data having blurring that is much smaller than a pattern cell, but contains a periodic artefact that is in phase with the dither pattern. Provided that the final result is dithered using the same pattern cell, this artefact is not noticeable in the output.

The size and shape of the filtering kernel used is a trade-off between blurring and color accuracy in the reconstructed background color. Additionally, a correction step is applied to preserve the average color. The thresholds used in the dither pattern are typically not linearly distributed, so averaging the dithered results does not return the original color. This is done to take into account physical features of the engine such as dot gain, and the optical characteristics of the inks or toners.

[Computer Implementation]

Figure 1B:
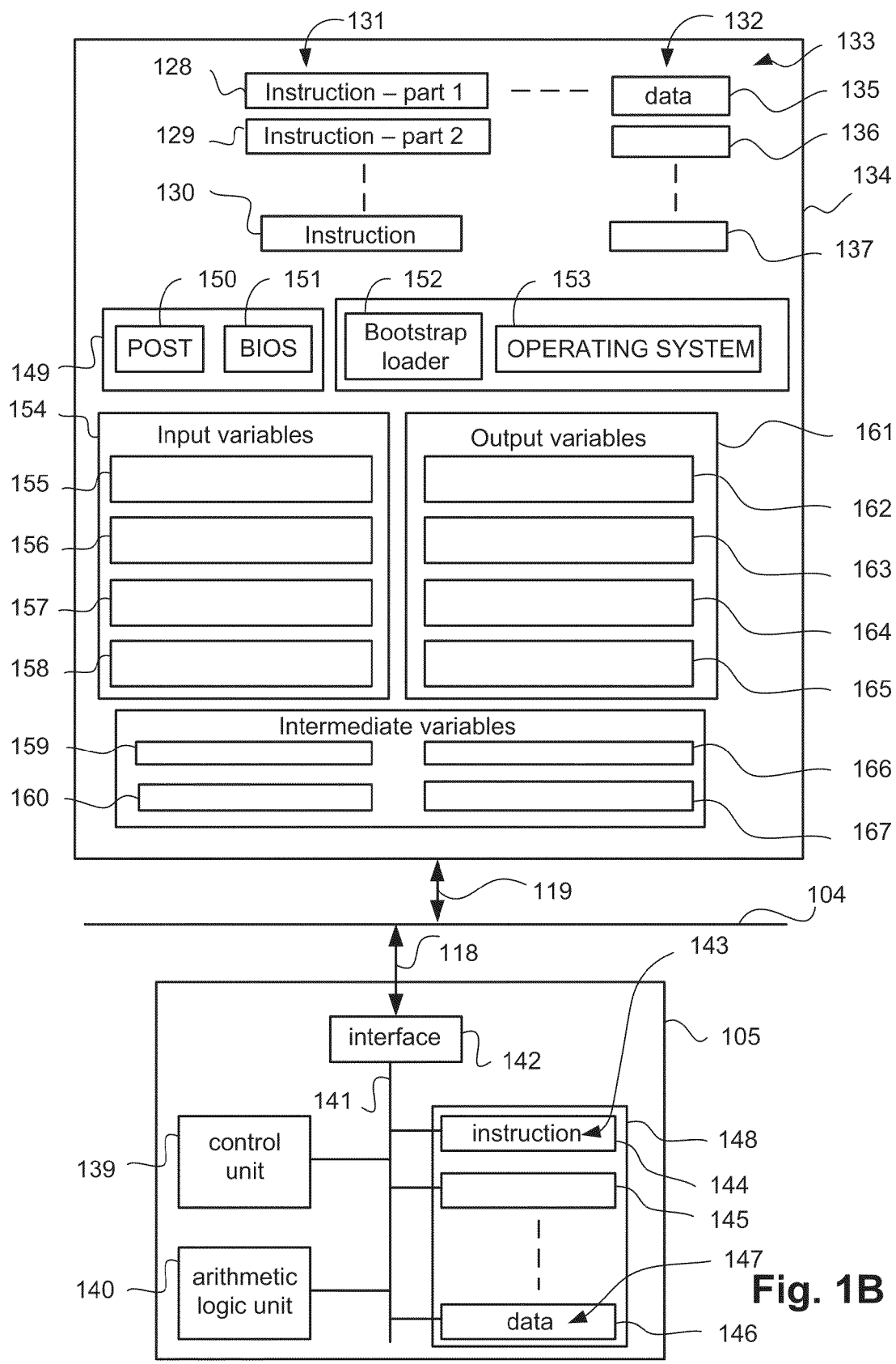

FIGS. 1A and 1B collectively form a schematic block diagram of a general-purpose computer system 100, upon which the various arrangements described can be practiced.

As seen in FIG. 1A, the computer system 100 is formed by a computer module 101, input devices such as a keyboard 102, a mouse pointer device 103, a scanner 126, a camera 127, and a microphone 180, and output devices including a printer 115, a display device 114 and loudspeakers 117. An external Modulator-Demodulator (Modem) transceiver device 116 may be used by the computer module 101 for communicating to and from a communications network 120 via a connection 121. The network 120 may be a wide-area network (WAN), such as the Internet or a private WAN. Where the connection 121 is a telephone line, the modem 116 may be a traditional "dial-up" modem. Alternatively, where the connection 121 is a high capacity (eg: cable) connection, the modem 116 may be a broadband modem. A wireless modem may also be used for wireless connection to the network 120.

The computer module 101 typically includes at least one processor unit 105, and a memory unit 106 for example formed from semiconductor random access memory (RAM) and semiconductor read only memory (ROM). The module 101 also includes an number of input/output (I/O) interfaces including an audio-video interface 107 that couples to the video display 114, loudspeakers 117 and microphone 180, an I/O interface 113 for the keyboard 102, mouse 103, scanner 126, camera 127 and optionally a joystick (not illustrated), and an interface 108 for the external modem 116 and printer 115. In some implementations, the modem 116 may be incorporated within the computer module 101, for example within the interface 108. The computer module 101 also has a local network interface 111 which, via a connection 123, permits coupling of the computer system 100 to a local computer network 122, known as a Local Area Network (LAN). As also illustrated, the local network 122 may also couple to the wide network 120 via a connection 124, which would typically include a so-called "firewall" device or device of similar functionality. The interface 111 may be formed by an Ethernet™ circuit card, a Bluetooth™ wireless arrangement or an IEEE 802.11 wireless arrangement.

The printer system 115 comprises a controller processor 1151 for executing a controlling program 1152, a pixel rendering apparatus 1153, and a printer engine 1154 coupled via a bus 1155. The printer 115 may also have a memory resident on the device itself. The pixel rendering apparatus 1153 is preferably in the form of an ASIC coupled via the bus 1155 to the controller processor 1151, and the printer engine 1154. However, the pixel rendering apparatus 1153 may also be implemented in software executed in the controller processor 1151.

In the computer system 100, the software application 133 creates page-based documents, where each page contains objects such as text, lines, fill regions, and image data. The software application 133 sends a high level description of the page (for example a Page Description Language (PDL) file) to the controlling program 1152 executing in the controller processor 1151 of the printer system 115. The controlling program 1152 interprets this high level description of the page and sends rendering instructions to the pixel rendering apparatus 1153. The program executing on the controller processor 1151 is also responsible for providing memory for the pixel rendering apparatus 1153, initialising the pixel rendering apparatus 1153, and instructing the pixel rendering apparatus 1153 to start rendering the page.

The pixel rendering apparatus 1153 uses the rendering instructions to render the page to pixels. The output of the pixel rendering apparatus 1153 is color pixel data, which may be used by the printer engine 1154.

When the controlling program 1152 receives the description of the page from the software application 133, the controlling program 1152 converts objects in the page description into an intermediate page representation called a display list. Each object in the display list generally contains a rendering instruction or fill. An object's fill indicates to the pixel rendering apparatus 1153 how to generate color information for pixels activated by the object. Examples of types of fills are flat colors, bitmaps, linear blends and radial blends. To generate a fill, the controlling program 1152 converts the object specified in the page description into a fill instruction that can be used by the pixel rendering apparatus 1153 to generate pixel color data.

Each fill instruction must be executed for each pixel in which an object the fill instruction is active. Therefore, each fill instruction may be executed a large number of times. Crucially, the performance of the pixel rendering system requires that the fill instruction be executed as efficiently as possible. For this reason, the controlling program 1152 generates fill instructions that are efficient for the pixel rendering apparatus 1153 to evaluate.

The interfaces 108 and 113 may afford either or both of serial and parallel connectivity, the former typically being implemented according to the Universal Serial Bus (USB) standards and having corresponding USB connectors (not illustrated). Storage devices 109 are provided and typically include a hard disk drive (HDD) 110. Other storage devices such as a floppy disk drive and a magnetic tape drive (not illustrated) may also be used. An optical disk drive 112 is typically provided to act as a non-volatile source of data. Portable memory devices, such optical disks (eg: CD-ROM, DVD), USB-RAM, and floppy disks for example may then be used as appropriate sources of data to the system 100.

The components 105 to 113 of the computer module 101 typically communicate via an interconnected bus 104 and in a manner that results in a conventional mode of operation of the computer system 100 known to those in the relevant art. Examples of computers on which the described arrangements can be practised include IBM-PC's and compatibles, Sun Sparcstations, Apple Mac™ or a like computer systems evolved therefrom.

The method of rendering graphical objects may be implemented using the computer system 100 wherein the processes of FIGS. 2-5, which can be implemented as one or more software application programs 133 executable within the computer system 100. In particular, the steps of the method of rendering graphical objects are affected by instructions 131 in the software 133 that are carried out within the computer system 100. The software instructions 131 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software 133 is generally loaded into the computer system 100 from a computer readable medium, and is then typically stored in the HDD 110, as illustrated in FIG. 1A, or the memory 106, after which the software 133 can be executed by the computer system 100. In some instances, the application programs 133 may be supplied to the user encoded on one or more CD-ROM 125 and read via the corresponding drive 112 prior to storage in the memory 110 or 106. Alternatively the software 133 may be read by the computer system 100 from the networks 120 or 122 or loaded into the computer system 100 from other computer readable media. Computer readable storage devices or media refers to any storage device that participates in providing instructions and/or data to the computer system 100 for execution and/or processing. Examples of such storage devices include floppy disks, magnetic tape, CD-ROM, a hard disk drive, a ROM or integrated circuit, USB memory, a magneto-optical disk, or a computer readable card such as a PCMCIA card and the like, whether or not such devices are internal or external of the computer module 101. Examples of computer readable transmission media that may also participate in the provision of software, application programs, instructions and/or data to the computer module 101 include radio or infra-red transmission channels as well as a network connection to another computer or networked device, and the Internet or Intranets including e-mail transmissions and information recorded on Websites and the like.

The second part of the application programs 133 and the corresponding code modules mentioned above may be executed to implement one or more graphical user interfaces (GUIs) to be rendered or otherwise represented upon the display 114. Through manipulation of typically the keyboard 102 and the mouse 103, a user of the computer system 100 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 117 and user voice commands input via the microphone 180.

FIG. 1B is a detailed schematic block diagram of the processor 105 and a "memory" 134. The memory 134 represents a logical aggregation of all the memory devices (including the HDD 110 and semiconductor memory 106) that can be accessed by the computer module 101 in FIG. 1A.

When the computer module 101 is initially powered up, a power-on self-test (POST) program 150 executes. The POST program 150 is typically stored in a ROM 149 of the semiconductor memory 106. A program permanently stored in a hardware device such as the ROM 149 is sometimes referred to as firmware. The POST program 150 examines hardware within the computer module 101 to ensure proper functioning, and typically checks the processor 105, the memory (109, 106), and a basic input-output systems software (BIOS) module 151, also typically stored in the ROM 149, for correct operation. Once the POST program 150 has run successfully, the BIOS 151 activates the hard disk drive 110. Activation of the hard disk drive 110 causes a bootstrap loader program 152 that is resident on the hard disk drive 110 to execute via the processor 105. This loads an operating system 153 into the RAM memory 106 upon which the operating system 153 commences operation. The operating system 153 is a system level application, executable by the processor 105, to fulfil various high level functions, including processor management, memory management, device management, storage management, software application interface, and generic user interface.

The operating system 153 manages the memory (109, 106) to ensure that each process or application running on the computer module 101 has sufficient memory in which to execute without colliding with memory allocated to another process. Furthermore, the different types of memory available in the system 100 must be used properly so that each process can run effectively. Accordingly, the aggregated memory 134 is not intended to illustrate how particular segments of memory are allocated (unless otherwise stated), but rather to provide a general view of the memory accessible by the computer system 100 and how such is used.

The processor 105 includes a number of functional modules including a control unit 139, an arithmetic logic unit (ALU) 140, and a local or internal memory 148, sometimes called a cache memory. The cache memory 148 typically includes a number of storage registers 144-146 in a register section. One or more internal buses 141 functionally interconnect these functional modules. The processor 105 typically also has one or more interfaces 142 for communicating with external devices via the system bus 104, using a connection 118.

The application program 133 includes a sequence of instructions 131 that may include conditional branch and loop instructions. The program 133 may also include data 132 which is used in execution of the program 133. The instructions 131 and the data 132 are stored in memory locations 128-130 and 135-137 respectively. Depending upon the relative size of the instructions 131 and the memory locations 128-130, a particular instruction may be stored in a single memory location as depicted by the instruction shown in the memory location 130. Alternately, an instruction may be segmented into a number of parts each of which is stored in a separate memory location, as depicted by the instruction segments shown in the memory locations 128-129.

In general, the processor 105 is given a set of instructions which are executed therein. The processor 105 then waits for a subsequent input, to which it reacts to by executing another set of instructions. Each input may be provided from one or more of a number of sources, including data generated by one or more of the input devices 102, 103, data received from an external source across one of the networks 120, 122, data retrieved from one of the storage devices 106, 109 or data retrieved from a storage medium 125 inserted into the corresponding reader 112. The execution of a set of the instructions may in some cases result in output of data. Execution may also involve storing data or variables to the memory 134.

The disclosed rendering arrangements can use input variables 154 that are stored in the memory 134 in corresponding memory locations 155-158. The rendering arrangements produce output variables 161 that are stored in the memory 134 in corresponding memory locations 162-165. Intermediate variables may be stored in memory locations 159, 160, 166 and 167.

The register section 144-146, the arithmetic logic unit (ALU) 140, and the control unit 139 of the processor 105 work together to perform sequences of micro-operations needed to perform "fetch, decode, and execute" cycles for every instruction in the instruction set making up the program 133. Each fetch, decode, and execute cycle comprises:

(a) a fetch operation, which fetches or reads an instruction 131 from a memory location 128;

(b) a decode operation in which the control unit 139 determines which instruction has been fetched; and (c) an execute operation in which the control unit 139 and/or the ALU 140 execute the instruction.

Thereafter, a further fetch, decode, and execute cycle for the next instruction may be executed. Similarly, a store cycle may be performed by which the control unit 139 stores or writes a value to a memory location 132.

Each step or sub-process in the processes of FIGS. 2 to 5 is associated with one or more segments of the program 133, and is performed by the register section 144-147, the ALU 140, and the control unit 139 in the processor 105 working together to perform the fetch, decode, and execute cycles for every instruction in the instruction set for the noted segments of the program 133.

The methods of dithering (halftoning) may alternatively be implemented in dedicated hardware such as one or more integrated circuits performing the functions or sub functions to be described. Such dedicated hardware may include graphic processors, digital signal processors, or one or more microprocessors and associated memories.

[Process]

Figure 2:
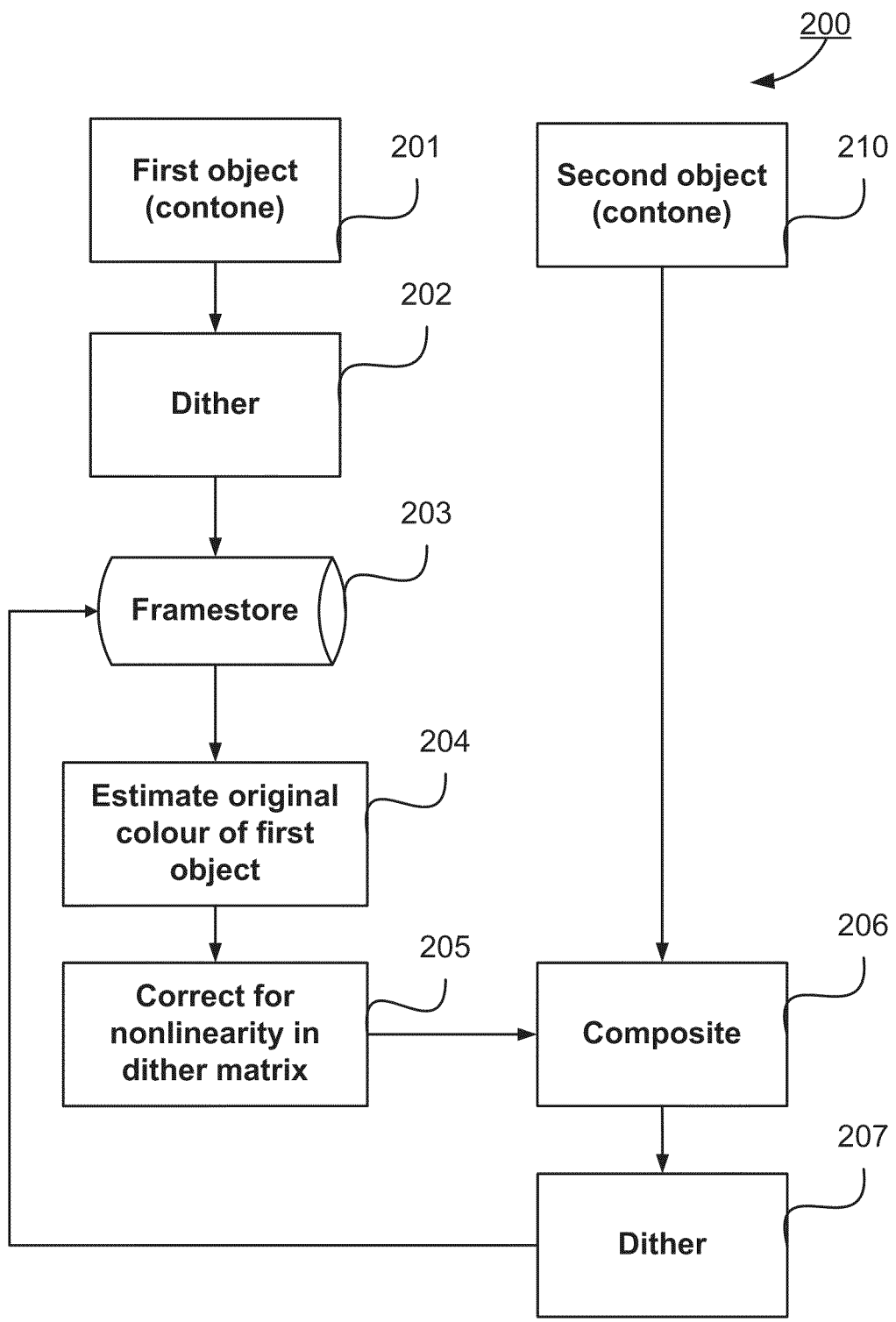
FIG. 2 is a high-level flowchart of a typical sequence of compositing operations performed on a group of objects by a renderer.

FIG. 2 is a schematic flow diagram illustrating a method 200 of rendering graphical objects. The method 200 determines a composite color for a region of overlap between a dithered object and a contone object. The method 200 is preferably implemented as at least part of the application program mentioned above and may be invoked when a printing function is selected by another application executing on the computer system 100. That other application may be any source of printable data such as a word processing application, a browser, a graphics drawing package, and so forth. Particularly, the method 200 operates on graphic page data for the color channels (CMYK) to be printed. In this regard, the method 200 may execute within the computer module 101 to render graphic data for reproduction on the printer 115, or alternatively execute within the printer 115 which receives the graphic data from the computer module 101 and performs the rendering as part of the reproduction process.

In the exemplary embodiment of this invention, shown in FIG. 2, a pixel-sequential renderer 1153 executes a portion of the process 200. In this case, a first contone object 201 is to be composited with a second contone object 210. For example, the first contone object 201 may be a background object, which is halftoned or dithered in step 202 and stored in a framestore 203, so that the memory requirement for buffering the first object in the memory of the printer 115 or memory 119 of the computer system 101 is reduced. This dithering can be achieved using a dither matrix, which is a pattern of threshold values that can be compared to the original image intensities to determine the discrete output for the dithered image. Sometimes a dither matrix is composed to produce a regular pattern of size varying dots. Another way of producing a halftoned pattern is using error diffusion. Unlike the repeated pattern used with a dither matrix, an error diffusion system is used as a series of pixel-to-pixel calls, producing a less regular variation across uniform shades. Each value at a given pixel is rounded to the nearest discrete level, which is either 0 or 1 in a discrete binary case, to provide an estimate. The difference between the actual value and this estimate is passed on to future pixels. As the next pixel is evaluated, the error from the last estimate is added to the current pixel value, perhaps giving a lighter pixel more of a chance to be rounded to 1, or vice versa. In this way, the overall average of a region of is preserved. Extending this further, color dithering is done by separating an image into separate color components and applying a separate dithering method to each color. This background object is to be composited with the second contone object 210, which, for example, is a semi-opaque foreground object.

To composite the first object 201 and the second object 210, the dithered first object 201 is converted by the processor 105 back to a contone object, because compositing with a dithered object produces undesirable artefacts as mentioned hereinbefore. In the exemplary embodiment of the invention, the processor 105 obtains the dithered object data 202 from the memory of the printer 115 or the memory 119 of the computer system 101, which is stored in the framestore 203. The method 200 using the processor 105 estimates the original color of the first object in step 204 using the halftone object data 202. There are several averaging or filtering methods for estimating the original color, one of which is elaborated hereinafter. Essentially, the averaging method seeks to obtain an accurate original color while minimizing the blurring of the object by employing a finite-sized filtering kernel. This kernel is preferably small taking into account the pixels in the immediate neighbourhood, and centrally weighted, which puts more weight on the contribution from the central pixel color. Steps 201, 202, and 204 are performed to determine a reconstructed contone object from the dithered object.

Determining the reconstructed contone object may comprise applying a filtering operation to a pixel of a different contone object 201 that is the basis of the reconstructed contone object that takes into account a value of the pixel and immediate neighbours of the pixel. The filtering operation may comprise a convolution with a Gaussian kernel, an inverse distance weighted kernel, or a uniform averaging kernel. The filtering operation may be centrally weighted on the pixel of the different contone object and takes into account pixels in the immediate neighbourhood of the pixel of the different contone object.

The estimated color from the estimating step 204 is passed on to step 205 to correct for the non-linearity of the dither matrix. Step 205 corrects for errors in the reconstructed contone color of the dithered object. The error correcting step corrects the reconstructed contone color for nonlinearity introduced by the filtering operation. In a black-and-white image, the dither matrix may produce a dithered image that can be darker than the original grayscale picture. On the other hand, for a color printer, because the combination of the toners does not hold perfectly for a printer, methods of dealing with this imperfection of ink combination are used. One method that may introduce such a non-linearity for dithering of a color pixel, involves limiting the number of ink colors that are used to render a specific pixel. By limiting the colors used, a smaller range of brightness of the colors creates the color area, thus minimizing the visibility of the dither (halftone) pattern. However, on the whole, the accuracy to the original color is compromised. Nevertheless, how the non-linearity is introduced is known, whether the nonlinearity is due to the average of the resulting dithered image being darker than the average should be, or the limitation put on the colors used for a color dithering. Using this knowledge, this process can be reversed, or at least, a more accurate original color can be estimated.

In step 206, first object with the estimated color profile from correcting step 205 (corrected contone) is composited with the second contone object 210. Compositing can be done using method described by Porter and Duff, for example, but many other techniques may be practiced. The method described by Porter and Duff takes into account the transparency of the objects, through the concept of an alpha channel, thus allowing the image elements to be combined correctly.

In step 207, the resulting composited image is dithered and passed to the framestore 203 to be buffered in the memory in the printer 115 or the memory 119. The result of the compositing step is converted to dithered data. The dithered data may be output to a printer or may be displayed on a display device, for example. Alternatively, the dithered resulting composited image may be an intermediate image that is subsequently further processed using the method 200 or by other processes.

EXAMPLE

Figure 3A:
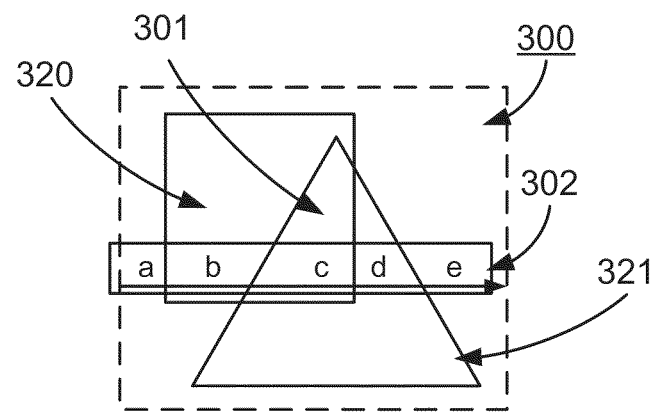
FIGS. 3A and 3B are block diagrams containing a group of objects to illustrate a typical sequence of compositing operations performed on the group of objects by a pixel sequential renderer upon a data buffer.
Figure 3B:
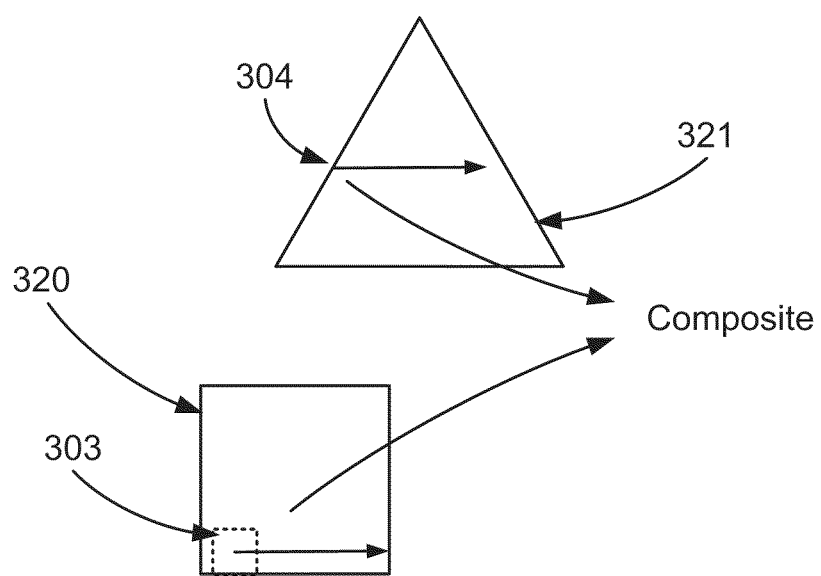

An exemplary rendering process is described hereinafter for two objects 320 and 321 that make up a portion of the image 300, as shown in FIGS. 3A and 3B. The process 200 is invoked to render a span of pixels 302, which comprises a compositing operation on, for example, a foreground graphical object 321 with a background dithered or dithered engine data 320. This dithered engine data 320 is stored in the framestore 203 of FIG. 2. In FIG. 3A, the background object 320 is composited with a semi-opaque object 321 composited with the background object 320, resulting in a scanline 302 which comprises 5 pixel runs with different characteristics, as follows:

a. Contribution from section 'a' of the span of pixels 302 (the image 300 from the framestore 203) hereinafter referred to as 302a;

b. Contribution from section 'b' of the span of pixels 302 (the background object 320 from the framestore 203) hereinafter referred to as 302b;

c. Contribution from section 'c' of the span of pixels 302 (the compositing of the foreground object 321 and the background object 320) hereinafter referred to as 302*c*;

d. Contribution from section 'd' of the span of pixels 302 (the foreground object 321 composited over the image 300) hereinafter referred to as 302*d*; and e. Contribution from section 'e' of the span of pixels 302 (the image 300 from the framestore 203) hereinafter referred to as 302*e*.

Figure 4:
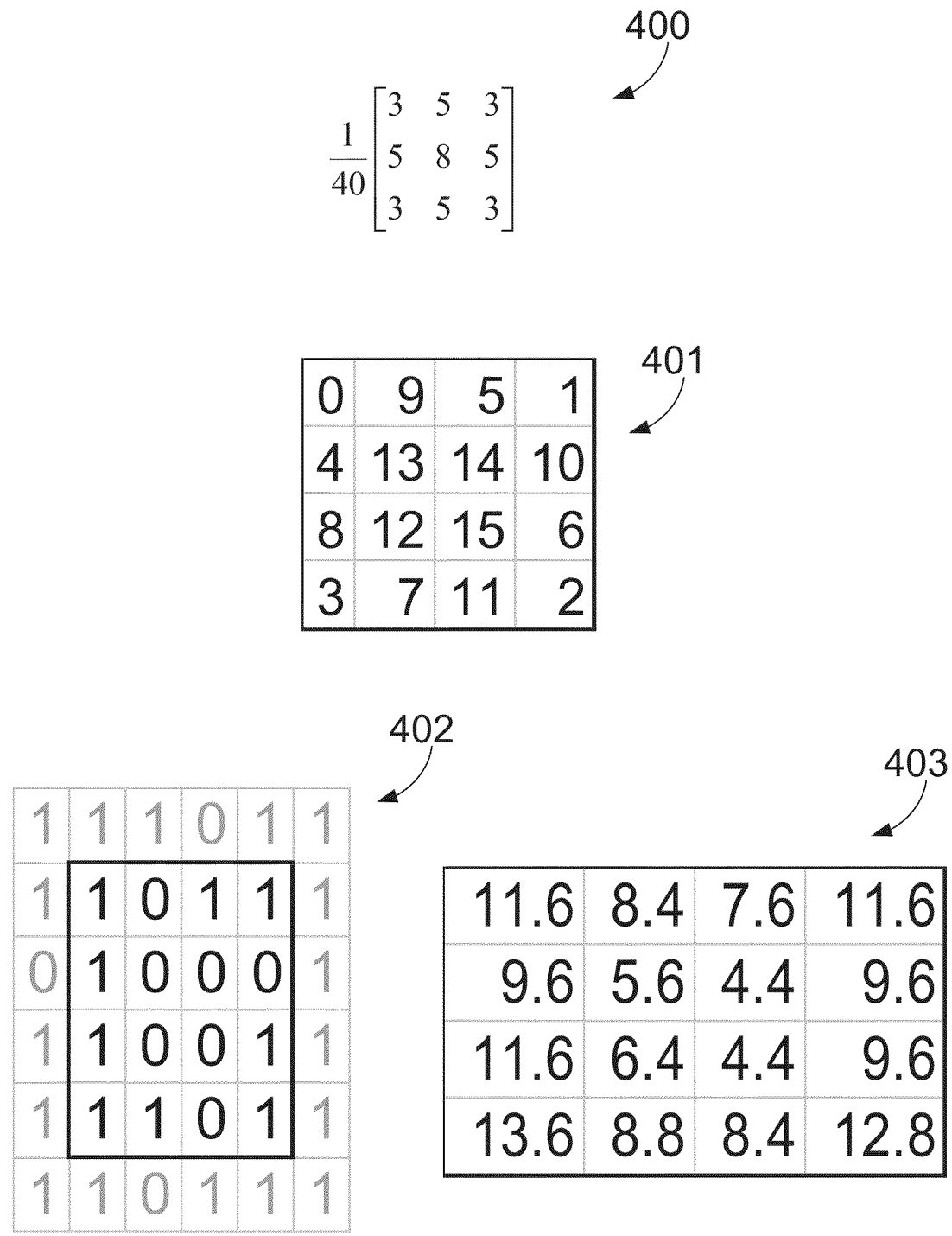
FIG. 4 is a block diagram illustrating dithering and reconstruction using a simple 4×4 cell.

Runs 302*c* and 302*d* require compositing, that is, the result contains a contribution from the foreground object 321 and a contribution from the background either from the background object 320 or the image 300. If there are no other objects in the image 300, in run 302*d*, the background is typically transparent or an opaque background color, such as white. This case is not discussed further as no special treatment is necessary to perform the compositing. On the other hand, for run 302*c*, the contribution of from the background object 320 is a dithered image obtained from the framestore 203 of FIG. 2. This dithered data is used to estimate the original color of the background object 320. In an exemplary embodiment of the invention, a filtering kernel is used to take a moving average of the color at each pixel in the background as at step 204 of FIG. 2. This is a convolution operation in which the kernel is placed over the dithered pixels as, for example, at 303 in FIG. 3B, so that corresponding elements are multiplied pairwise, and the results summed. The result of this filtering kernel serves as background for the compositing operation with the corresponding pixel on the scanline 304 of foreground object 321 in FIG. 3B. Any filtering kernel can be used depending on the trade-off requirement between blurring and color accuracy of the reconstructed background color. In the exemplary embodiment of this invention, the filtering kernel 400 shown in FIG. 4 is smaller than the dither cell, and is centrally weighted, such as an approximately Gaussian or inverse-distance-weighted kernel. For example, the filtering kernel 400 in FIG. 4 is:

$$\frac{1}{40}\begin{bmatrix} 3 & 5 & 3 \\ 5 & 8 & 5 \\ 3 & 5 & 3 \end{bmatrix}.$$

A filtering kernel with central weighting allows the pixel of interest to contribute more significantly to the reconstructed background color. Depending on the pattern cell different kernels may be used. In another embodiment of the invention, a large stochastic pattern containing high frequency noise may be used. A larger kernel may be used here to collect more samples as the effect of blurring is less noticeable. In yet another embodiment, a smaller screening pattern is used which introduces a periodic screen pattern at typically 150 dpi. Since surrounding pattern cell values are well correlated, this smaller kernel provides sufficient color accuracy, and the resulting periodic noise is well masked by the final screening step.

After obtaining the filtered color value at each pixel, the estimated color value is corrected for non-linearity in the dither pattern distribution at step 205 of FIG. 2, unless this distribution is known to be linear. FIG. 4 illustrates an example 4×4 dither pattern 401 having 16 entries, for dithering a 4-bit value down to 1-bit. Since this is linear, the dither pattern 401 contains all the values from 0 to 15, and each value occurs exactly once. When an input value of, say, 9 is dithered with this pattern the result is shown in 402 of FIG. 4. If the result in 402 (with neighbouring pixels added assuming the pattern repeats on all sides) is convolved with the kernel 400, the results (multiplied by 16) are as shown in 403 of FIG. 4. When this is dithered again with the pattern 401, the results are the same as in 402. In practice the dither patterns are larger, as is the input range, but FIG. 4 is sufficient to illustrate the principle.

Figure 5A:
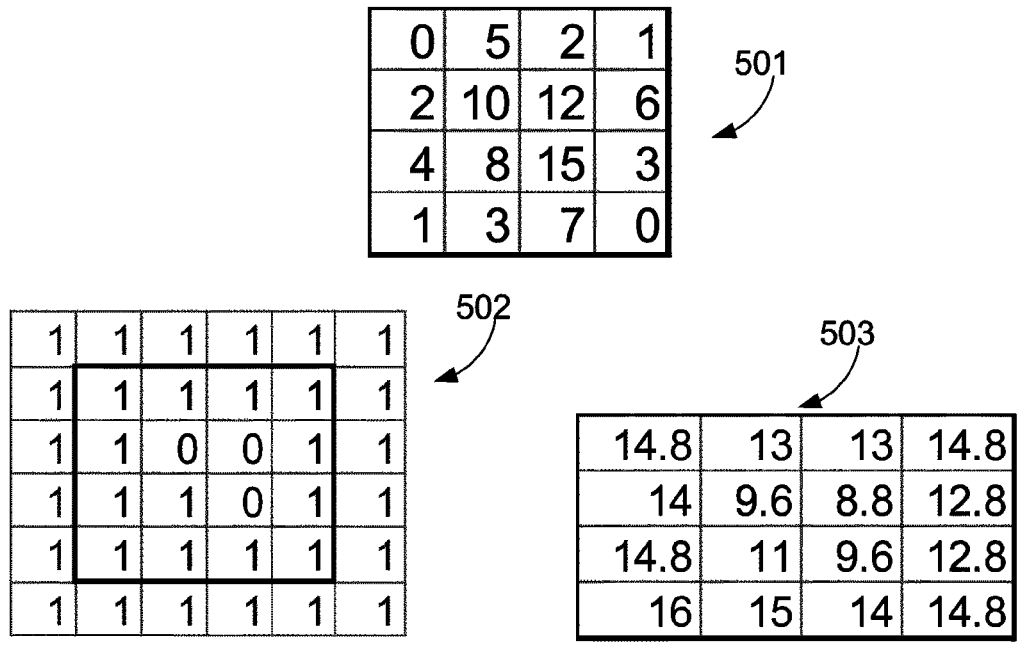
FIGS. 5A and 5B are a block diagram of dithering and reconstruction using a simple 4×4 cell with a bias due to nonlinearity and a corresponding plot, respectively.
Figure 5B:
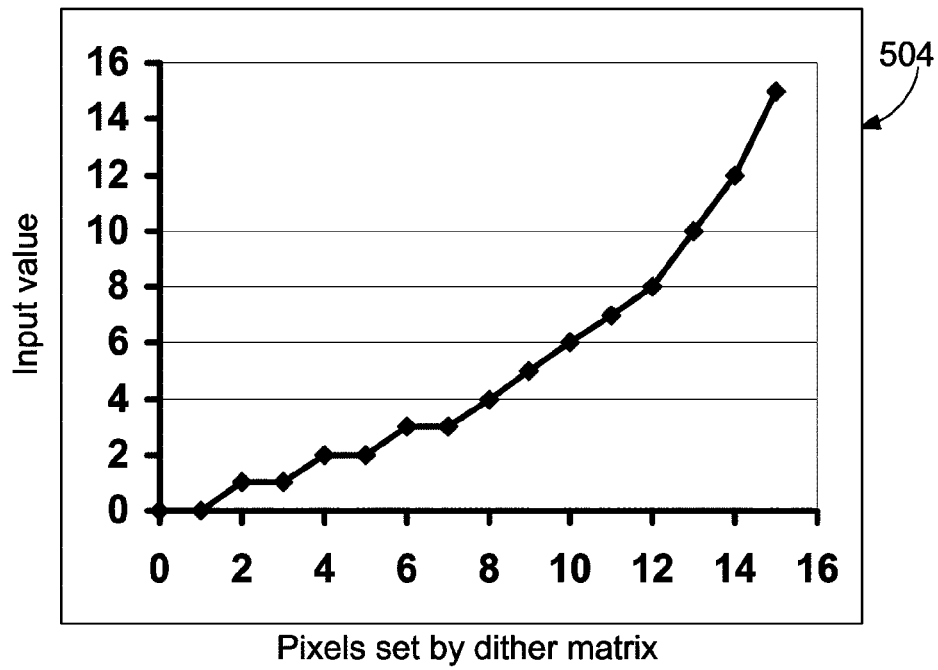

In practice the patterns are not constructed this way, but have a preponderance of values toward one end or the other. In other words, due to the dither matrix, more pixels might be set to one if the dither pattern 501 of FIG. 5 contains more low values than high ones, and vice versa. When filtering, this introduces a bias that is noticeable on areas of color of any size. In FIG. 5, the dither pattern 501 contains more low values than high ones, even though the dither pattern 501 still spans the range 0 to 15. This means that the same input value of 9 sets more pixels in the dithered output 502. When filtered, the dithered output 502 produces a result of 503, having an average value that is now thirteen.

In the exemplary embodiment of this invention, a lookup table 504 is constructed from the dither pattern by sorting the values of the dither pattern. This lookup table is used to remove the bias. The lookup table 504 has been made as just described in the exemplary embodiment and gives an integer result of ten when the average thirteen is input, much closer to the expected result of nine.

In another embodiment, the lookup table for correcting the bias of the dither matrix can be obtained by fitting a quadratic to the dither pattern by using three points: the minimum and maximum values, and a median of the sorted pattern values. In the example dither matrix 501 of FIG. 5, the median is four and the mean of the elements of the dither matrix is 4.938. The quadratic used is $$y = ax(b - x)$$

where $$b = \frac{N\left(M - \frac{N}{4}\right)}{M - \frac{N}{2}},$$

$$a = \frac{1}{b - N}$$

and N is the highest natural number that can fit into the dither pattern, or in other words, one less the number of elements in the dither matrix. M is the median of the dither matrix.

In the example dither matrix 501, N is 15 and M is 4.938. This passes through the 3 points (0,0), (15,15), (7.5,4.938). Using the lookup table or graph that resembles graph 504 in FIG. 5 obtained by fitting the three points, an input of thirteen obtained from the estimating step 204 of FIG. 2 gives a result of 11.4. This is a little high compared with the expected result of nine, but this result is expected, because the fitted curve is not perfect. In yet another embodiment, other kinds of curve may be fitted or measures such as the mean may be used. However, as this step is performed per pixel, it is important not to burden the renderer 1153 with a complex process for correcting the bias of each reconstructed pixel color.

Once filtered and corrected for bias, the background pixel values may be used in compositing at step 206. The background pixel values may still contain some periodic variation due to the dither pattern not being completely removed. This artefact is not noticeable in the output for most compositing operations, because the artefact is in phase with the original dither pattern with which the artefact is re-dithered at step 207 of FIG. 2. FIG. 4 shows that the high values of the filtered output 403 correspond to the low values in the original dither pattern 401, and so the high values are likely to be set in the final output anyway. Similarly, the low values are likely to be clear in the final output.

The embodiments of the invention are also applicable to other kinds of bit-depth reducing processes, such as stochastic screening, error diffusion, or the like, as well as reduction to bit depths other than 1-bit. This invention is also applicable even if the framestore is generally used for the storage of intermediate rendering results, or is used to recover from error conditions, or is only a partial representation of the output.

Figure 6:
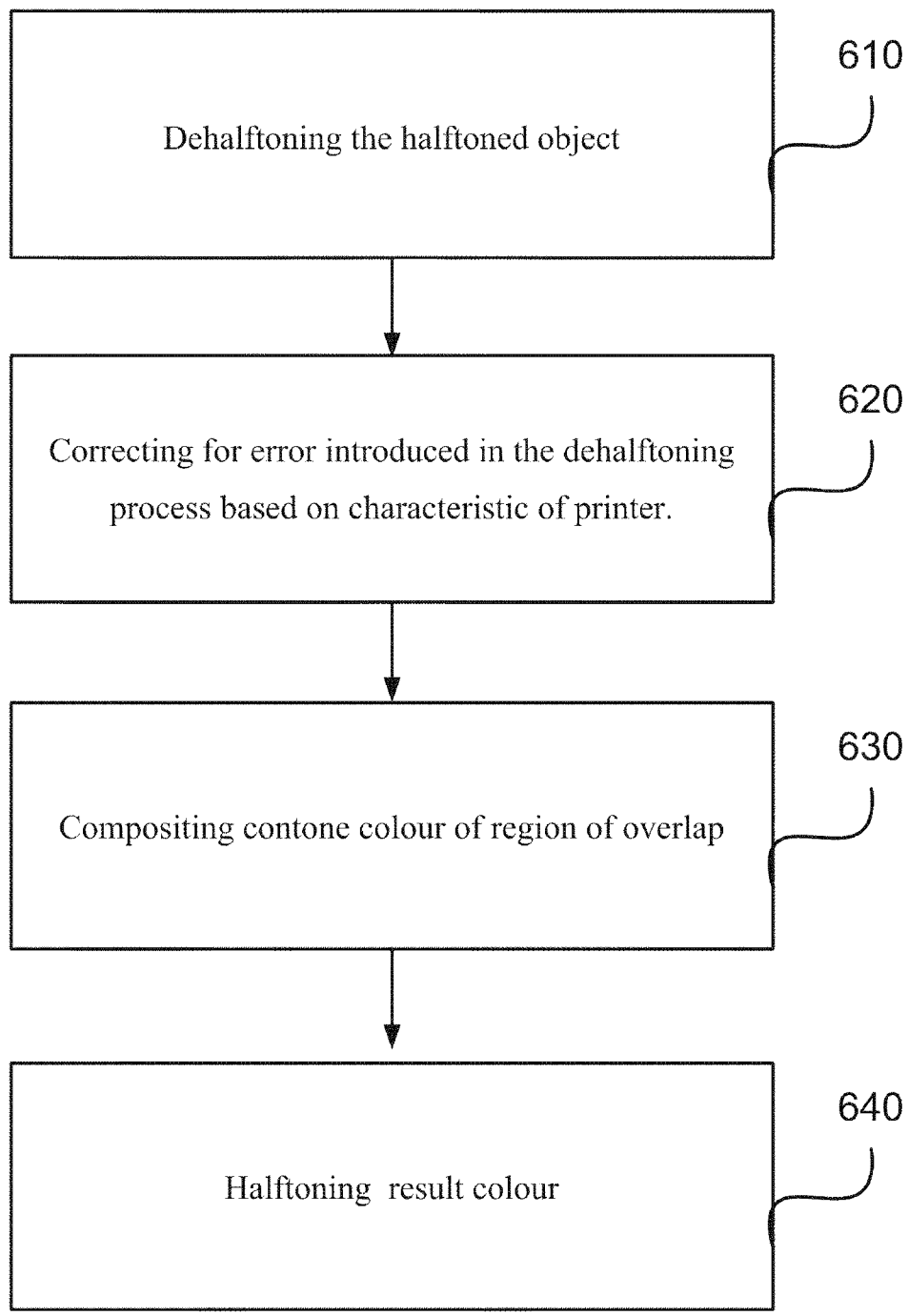
FIG. 6 is a high-level flowchart of a method of rendering a region of overlap between a first object having halftoned pixel data and a second object having contone pixel data using a marking engine.

FIG. 6 illustrates a computer-implemented method of rendering a region of overlap between a first object having halftoned pixel data and a second object having contone pixel data using a marking engine. In dehalftoning step 610 of the exemplary embodiment, the first object, which is halftoned, is dehalftoned to determining a contone color in the region of overlap. However, in another implementation, the dehalftoning process is not bounded by the region of overlap, which means that the whole object is dehalftoned. This dehalftoning step 610 uses the halftoned pixel data of the object and is based on a characteristic of the marking engine (printer). As mentioned hereinbefore, the halftoning process introduces a bias that results in the object being darker than the object should be. This bias is dependent on the characteristics of the printer, for example, the concentration of the ink and the resolution of the printer. If the ink is generally faint, the dithering matrix is biased such that there are more dots being deposited compared to the ink being a more vibrant color, for instance. This difference occurs such the dithered color of the object appears similar to a user, and dependent on the visual perception of color of the human eye. The characteristics are pre-determined based on the calibration in the factory in the exemplary embodiment. However, there is the possibility of calibration on the fly through optical detectors resident on the printers.

In correcting step 620 following the dehalftoning process, where in the exemplary embodiment, the dithered pixels are averaged over a pre-determined area as described hereinbefore, the processor 105 corrects for error in the determined contone color of the region of overlap based on the characteristic of the marking engine. In other words, if the objects or the region of overlap has a color that is darker than the color should be, the intensity of the color is reduced to match the intended color listed in the page description language. Then, the contone color of the region of overlap is composited with the contone pixel data of the new incoming second object, which has a contone color, to produce a result color in compositing step 630. The result color is halftoned using a halftoning process based on the characteristic of the marking engine (printer). The characteristics of the printer (marking engine) are reflected in the dither matrix used in the halftoning process. Thus, the correction of error is also affected by the characteristic of the marking engine.

In the case that memory resources are running low on a printing system, the first object is halftoned, but when there are further incoming objects for compositing, this halftoned first object is dehalftoned so that the compositing process can occur. The correcting step 620 allows for an accurate representation of the color of the first object, as intended in the page description language received by the printer.

As described hereinbefore with reference to FIG. 2, the method of FIG. 6 may execute within the computer module 101 to render graphic data for reproduction on the printer 115, or alternatively execute within the printer 115 which receives the graphic data from the computer module 101 and performs the rendering as part of the reproduction process.

INDUSTRIAL APPLICABILITY

The arrangements described are applicable to the computer and data processing industries and particularly for the rendering graphical objects.

Methods, apparatuses, and computer program products for determining a composite color for a region of overlap between a dithered object and a contone object have been described. The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

I claim:

1. A computer-implemented method of rendering a region of overlap between a first object having halftoned pixel data and a second object having contone pixel data using a marking engine, said method comprising the steps of:
   dehalftoning the first object to determining a contone color in the region of overlap using said halftoned pixel data and a dehalftoning process, said dehalftoning process based on a characteristic of the marking engine;
   correcting for error in the determined contone color of the region of overlap based on the characteristic of the marking engine;
   compositing the contone color of the region of overlap with the contone pixel data of the second object to produce a result color; and
   halftoning the result color using a halftoning process based on the characteristic of the marking engine.

2. A computer-implemented method of determining a composite color for a region of overlap between a dithered object and a contone object, said method comprising the steps of:
   determining a reconstructed contone object from the dithered object;
   correcting for errors in the reconstructed contone color of the dithered object; and
   compositing the corrected contone object and the contone object to determine the composite color for the region of overlap.

3. The method as claimed in claim 2, wherein the step of determining said reconstructed contone object comprises applying a filtering operation to a pixel of a different contone object that is the basis of said reconstructed contone object, said filtering operation takes into account a value of the pixel and a plurality of immediate neighbours of the pixel.

4. The method as claimed in claim 3, wherein said filtering operation comprises a convolution with a Gaussian kernel, an inverse distance weighted kernel, or a uniform averaging kernel.

5. The method as claimed in claim 4, wherein the kernel size is smaller than the size of a dither matrix used to provide said dithered object.

6. The method as claimed in claim 3, wherein said filtering operation is centrally weighted on the pixel of the different contone object and takes into account pixels in the immediate neighbourhood of the pixel of the different contone object.

7. The method as claimed in claim 3, wherein the error correcting step corrects the reconstructed contone color of the dithered object for nonlinearity introduced by the filtering operation.

8. The method as claimed in claim 2, wherein the step of determining said reconstructed contone object comprises dithering a different contone object that is the basis of said reconstructed contone object.

9. The method as claimed in claim 2, further comprising the step of converting a result of the compositing step to a dithered data.

10. The method as claimed in claim 9, further comprising storing the dithered data in a framestore.

11. The method as claimed in claim 2, wherein the compositing step comprises a transparency blending operation, the reconstructed contone object and the contone object each comprising an alpha channel.

12. An apparatus for determining a composite color for a region of overlap between a dithered object and a contone object, said apparatus comprising:
   a memory for storing data and a computer program; and
   a processor unit coupled to the memory for executing a computer program, said memory and said processor configured to determine said composite color, the computer program comprising:
      computer program code means for determining a reconstructed contone object from the dithered object;
      computer program code means for correcting for errors in the reconstructed contone color of the dithered object; and
      computer program code means for compositing the corrected contone object and the contone object to determine the composite color for the region of overlap.

13. The apparatus as claimed in claim 12, wherein said computer program code means for determining said reconstructed contone object applies a filtering operation to a pixel of a different contone object that is the basis of said reconstructed contone object, said filtering operation taking into account a value of the pixel and a plurality of immediate neighbours of the pixel.

14. The apparatus as claimed in claim 13, wherein said filtering operation is centrally weighted on the pixel of the different contone object and takes into account pixels in the immediate neighbourhood of the pixel of the different contone object, or comprises a convolution with a Gaussian kernel, an inverse distance weighted kernel, or a uniform averaging kernel.

15. The apparatus as claimed in claim 12, wherein said computer program code means for compositing applies a transparency blending operation, said reconstructed contone object and said contone object each comprising an alpha channel.

16. A non-transitory computer readable storage medium having recorded therein a computer program for determining a composite color for a region of overlap between a dithered object and a contone object for execution by a processing unit, the computer program comprising:
   computer program code means for determining a reconstructed contone object from the dithered object;
   computer program code means for correcting for errors in the reconstructed contone color of the dithered object; and
   computer program code means for compositing the corrected contone object and the contone object to determine the composite color for the region of overlap.

17. The non-transitory computer readable storage medium as claimed in claim 16, wherein said computer program code means for determining said reconstructed contone object applies a filtering operation to a pixel of a different contone object that is the basis of said reconstructed contone object, said filtering operation taking into account a value of the pixel and a plurality of immediate neighbours of the pixel.

18. The non-transitory computer readable storage medium as claimed in claim 17, wherein said filtering operation comprises a convolution with a Gaussian kernel, an inverse distance weighted kernel, or a uniform averaging kernel.

19. The non-transitory computer readable storage medium as claimed in claim 17, wherein said filtering operation is centrally weighted on the pixel of the different contone object and takes into account pixels in the immediate neighbourhood of the pixel of the different contone object.

20. The non-transitory computer readable storage medium as claimed in claim 16, wherein said computer program code means for compositing applies a transparency blending operation, said reconstructed contone object and said contone object each comprising an alpha channel.

* * * * *